July 21, 1942.   R. P. SCHWARTZ   2,290,387
MEANS FOR RECORDING THE GAIT AND MUSCLE FUNCTIONING OF ANIMATE BODIES
Filed Aug. 1, 1938   3 Sheets-Sheet 1
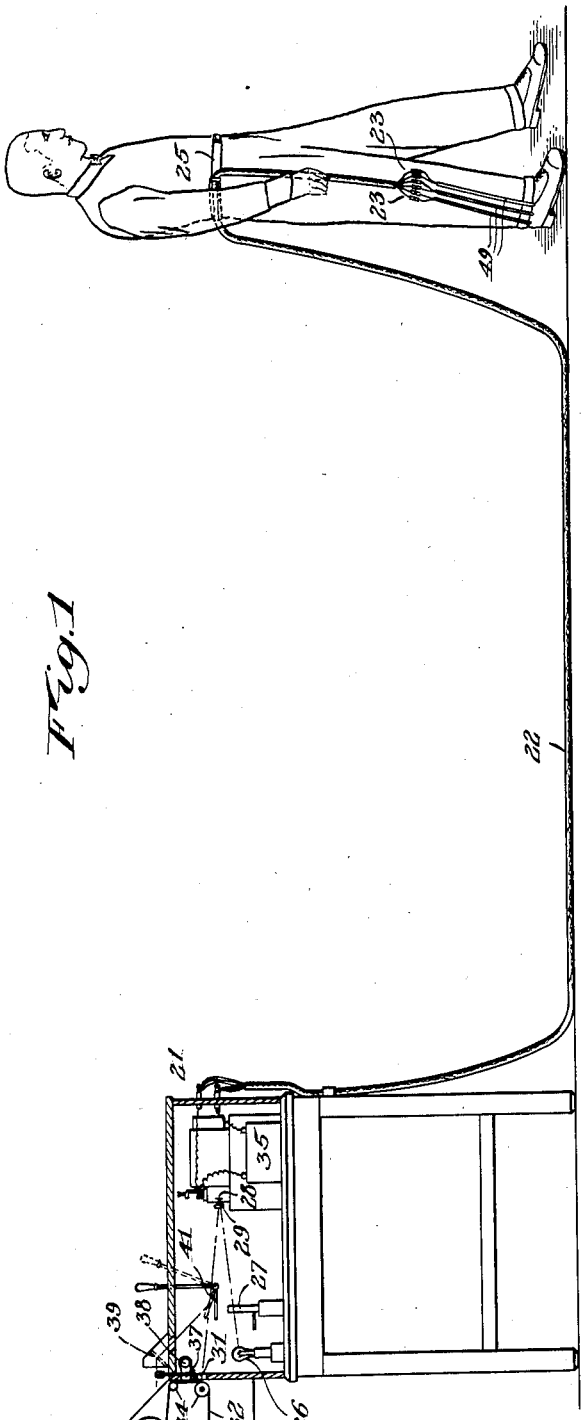
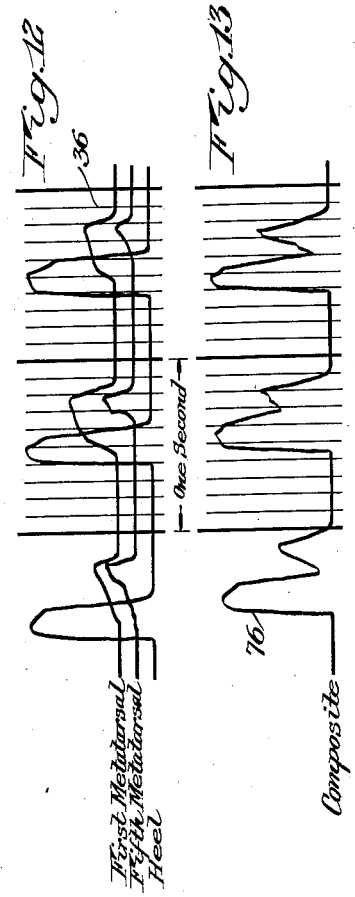
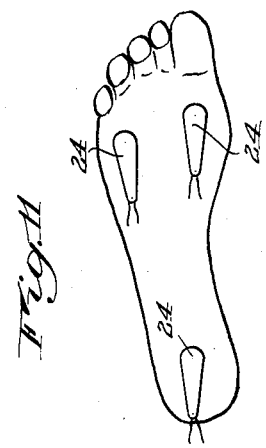
INVENTOR.
Russell Plato Schwartz
BY Cumpston & Shepard
his ATTORNEYS July 21, 1942.   R. P. SCHWARTZ   2,290,387
MEANS FOR RECORDING THE GAIT AND MUSCLE FUNCTIONING OF ANIMATE BODIES
Filed Aug. 1, 1938   3 Sheets-Sheet 2
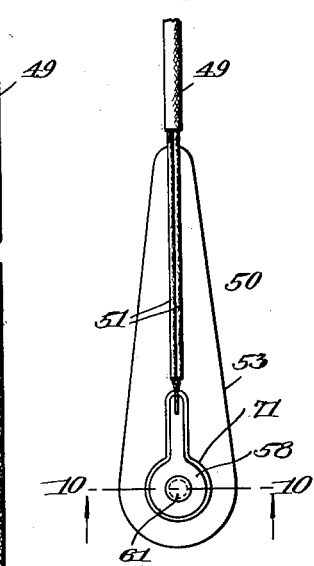
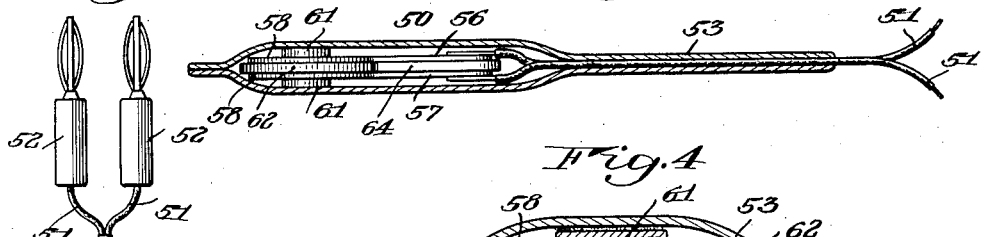
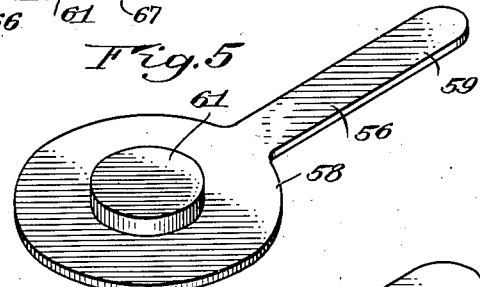
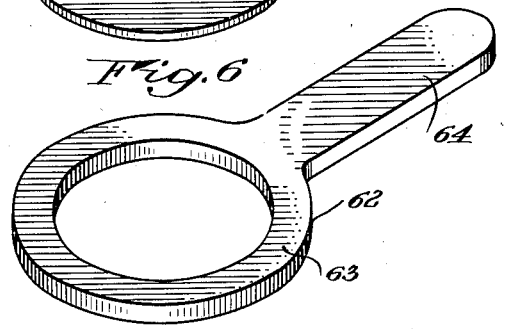
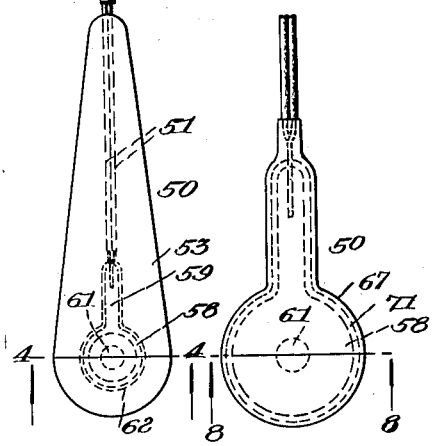
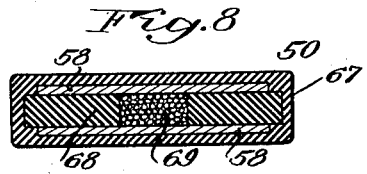
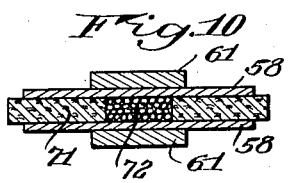
INVENTOR.
Russell Plato Schwartz
BY Cumpston & Shepard
his ATTORNEYS July 21, 1942.  R. P. SCHWARTZ  2,290,387
MEANS FOR RECORDING THE GAIT AND MUSCLE FUNCTIONING OF ANIMATE BODIES
Filed Aug. 1, 1938  3 Sheets—Sheet 3

INVENTOR.
Russell Plato Schwartz
BY Cumpston & Shepard
his ATTORNEYS

Patented July 21, 1942

2,290,387

UNITED STATES PATENT OFFICE 2,290,387

MEANS FOR RECORDING THE GAIT AND MUSCLE FUNCTIONING OF ANIMATE BODIES

Russell Plato Schwartz, Rochester, N. Y.

Application August 1, 1938, Serial No. 222,380

7 Claims. (Cl. 73—151)

This invention relates to apparatus for recording and analyzing the gait and the functioning of the muscles of man (bipeds) and animals (quadrupeds). This invention may be used to record the gait of soldiers and civilians, as well as patients, and may also be applied to the study of the gait of horses as well as other quadrupeds. Reference is hereby made to my copending application, Serial No. 756,710, filed December 8, 1934, of which this application is a continuation in part.

My means for recording the gait of a person has primarily been developed to provide a series of clinical records by which abnormalities in the gait of a person may be recorded, and the progress of treatment of an abnormal gait and the muscular functioning of the human body may be recorded and expressed through the precision of physical laws.

Abnormal locomotion and deformities of the feet are recognized causes of nervous, muscular and other disorders of the body. Moreover, affectation due to neuromuscular and vascular pathologic processes, together with congenital and acquired deformities of the lower extremities and back are recognized causes of abnormal locomotion. Therefore a study of the gait of a person and the deformities of the foot are important not only in determining the cause of nervous, muscular and other disorders of the body, but also nervous, muscular and other disorders of the body express themselves in abnormalities of gait.

The complexity of the phenomena of normal gait transcends the power of visual analysis. Therefore, I have recognized that some means must be provided for recording graphically or otherwise the gait of a person. When obtained these graphs may be compared with an analysis of a normal gait, defects observed, and corrective methods applied.

I have further recognized that the functioning of the osseous tripod comprising the oscalsis, the fifth metatarsal head, and the first metatarsal head, is of prime importance. Three factors of the functioning of the osseous tripod are of importance in studying the gait of a person; First, the sequence of weight bearing of various parts of the osseous tripod; the duration of the weight on each part of the osseous tripod; and the magnitude of the weight on each part during the progress of a step. Considering a single step of a person's gait at the initial portion of the step, the weight should be almost entirely on the oscalsis or heel bone. As the step progresses the fifth metatarsal head should commence to function and a portion of the weight should be removed from the oscalsis and placed upon the fifth metatarsal head. During the latter portions of a step the weight should be removed from the oscalsis and distributed between the fifth metatarsal head and the first metatarsal head and at the instant the foot leaves the ground that portion of the weight carried by the foot under consideration should be borne almost entirely by the first metatarsal head.

By making periodic graphical records of the functioning of the osseous tripod, including the sequence, the duration and magnitude of the weight on each part of the osseous tripod, a record of the improvement or lack of improvement in the gait of a person as treatment progresses may be obtained. Moreover, such a graphical analysis enables the recording of the influence on the feet of ill fitting shoes such as shoes which are too short, too long, too narrow, or too wide to thereby enable recommendations of corrective measures.

An object of the invention is to provide a means for observing and recording the gait of a person.

Another object of my invention is the provision of a means for recording the pressure or weight load placed on each part of the foot in walking.

Another object of my invention is the provision of a means for recording the gait of a person in walking so that the effect of ill fitting shoes may be studied and remedies applied.

A further object of my invention is the provision of a means whereby the functioning of the osseous tripod in walking may be studied to determine the sequence, the duration and magnitude of placing weight on various parts of the osseous tripod in walking.

My invention further provides a novel apparatus for obtaining visual record of the gait of a person including a sequence of placing weight load on the oscalsis, the fifth metatarsal head, and the first metatarsal head, the duration of the weight load on said parts of the osseous tripod and the magnitude of the weight load on said parts of each phase of a step.

To these and other ends the invention resides in certain improvements and combinations of parts, all as will be hereinafter more fully described, the novel features being pointed out in the claims at the end of the specification.

In the drawings:

Fig. 1 is a diagrammatic view showing an apparatus suitable for carrying out my novel method of recording the gait of a person;

Fig. 2 is a view showing one of the sole pads and the connecting wires thereto;

Fig. 3 is a side elevation partly in section of the sole pad of Fig. 2;

Fig. 4 is a view taken on the line 4—4 of Fig. 2;

Fig. 5 is a perspective view showing one of the conducting plates of the sole pad of Figs. 2, 3, and 4;

Fig. 6 is a perspective view showing the insulating element of one of the sole pads of Figs. 2, 3, and 4;

Fig. 7 is a view showing a modification of the sole pad shown in Fig. 2;

Fig. 8 is a view taken on the line 8—8 of Fig. 7;

Fig. 9 is a view showing another modified form of the sole pad shown in Fig. 2;

Fig. 10 is a view taken on the line 10—10 of Fig. 9, with the enveloping covering for the conducting plates removed;

Fig. 11 is a view showing three sole pads placed on the sole of the foot approximately in the position for obtaining the desired records;

Fig. 12 is a view showing a section of the film upon which a graphical analysis of the gait of a person has been made;

Fig. 13 is a view showing a section of film upon which a composite curve has been recorded;

The same reference numerals throughout the several views indicate the same parts.

As shown in Fig. 1 the novel apparatus for obtaining a record of the gait of a person comprises an oscillograph, generally indicated by the numeral 21, and a flexible conduit 22 housing a plurality of conductors 23 which lead through detachable connections to sole pads 24. The conduit 22 may be carried by a belt worn by the person whose gait is to be recorded and the sole pads may be retained in position adjacent the sole of the person's foot in any suitable manner.

Figure 14:
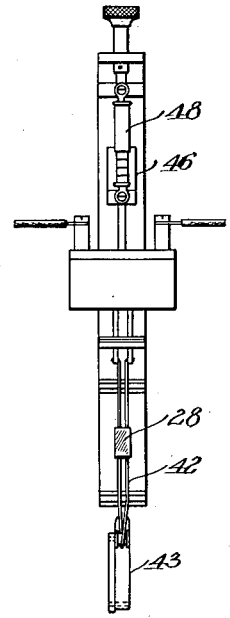
Fig. 14 is a front elevation of part of the oscillograph.
Figure 15:
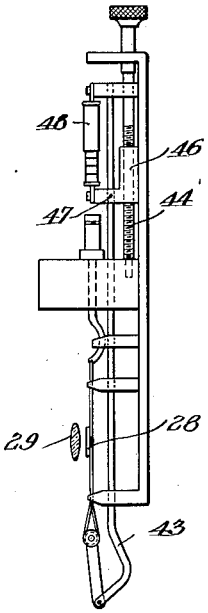
Fig. 15 is a side elevation of the same.

The oscillograph 21, parts of which are also shown in Figs. 14 and 15, may be briefly described. In general light from a light source 26 projects through an aperture 27 on to an oscillograph mirror 28. The beam of light is then reflected through a lens 29, an aperture or horizontally extending slit 31 and on to a sensitized film 32. The sensitized film is mounted on suitable rolls 33 carried over guide rolls 34, and is driven at a constant rate of speed in any well known manner. As shown in Fig. 12 the film is divided by horizontal lines 36 graduated along the film to indicate time. A supply of power is furnished by a battery 35.

The recording mechanism may be provided with a second aperture 37 and a light source 38 adjacent thereto between which may be interposed a transparent plate carrying a legend giving data concerning the patient's name, weight, age, etc.

The oscillograph may also be provided with a view plate 39 through which, by means of an adjustable mirror 41 normally held out of the path of the light beam, light from the light source 26 may be cast upward into the view plate so as to ascertain whether the oscillograph is functioning properly.

The operating parts of the oscillograph, shown in Figs. 14 and 15, may be of conventional construction and comprise wires 42 which carry a mirror 28. The mirror is oscillated backward and forward in a horizontal plane in the well known manner of an oscillograph in accordance with the flow of current through the wires 42. The wires 42 may be mounted on suitable adjusting means for varying the tension of the wires comprising a rod 43 which is adjustable by means of a screw 44. The adjusting screw carries a block 46 rigidly secured, as indicated at 47, to the rod 43. An indicating spring 48 may be provided to show the tensioning of the wires 42.

The preferred form of the sole pads generally indicated by the numeral 50 shown in Figs. 2 to 6, inclusive, comprises a conduit 49, containing wires 51 leading to the conducting plates carried by the sole pad, and a pair of plugs 52 by which the sole pads are detachably connected to plugs carried on the ends of the conductors 23. As shown in Fig. 3, the wires 51 enter a sack or envelope 53, preferably of leather, the two halves of which are secured together by cement or other means 54, shown in Fig. 4. The wires are rigidly secured by solder, or other means, to conductors 56 and 57. Each of the conductors 56 and 57 comprises a substantially circular conducting plate 58, an outwardly extending part 59 to which the wires are attached, and a pressure part 61 for receiving the pressure applied on the sole of the foot by the body weight. The conducting plates 58 as shown in Fig. 4 face each other and are separated at their outer peripheries by a substantially non-compressible insulating member 62, such as mica or equivalent material. The insulating member 62, shown in Fig. 6, comprises an annular ring portion 63 adapted to lie between the outer circumferential edges of the conducting plates 58 and an outwardly extending part 64 adapted to lie between the parts 59 of the conductors 56 and 57.

Between the conducting plates and encircled by the insulating ring 63 is a mass of coarse, granulated or flaked carbon or equivalent material 66. The carbon particles interpose a resistance between the conducting plates which varies with the pressure exerted on the plates, it being understood that the plates are sufficiently flexible to deflect somewhat under the load imposed by the weight of a man in walking. As the pressure on the plates varies the current passing between the plates varies thereby to oscillate the mirror of the oscillograph. The assembly of conducting plates, insulation, and the pressure receiving parts 61 is enclosed and hermetically sealed in a sack or envelope 67 of latex or other material.

In Figs. 7 and 8 I have shown a modification of the sole pad described above, wherein the conducting plates 58 are separated and insulated from each other by a resilient rubber ring 68. Interposed between the conducting plates 58 and within the annular rubber ring is a mass of coarse granulated carbon 69. The annular rubber ring 68 may be wider than the mica insulating ring 63 of the preferred form of my invention, since pressure received on the conducting plates at any portion thereof is distributed, by reason of the resiliency of the rubber ring, to the carbon mass. In this modification the pressure receiving parts 61 of the conductors 56 and 57 may be omitted. A latex envelope 67 for the parts may be provided and the assembly may be enclosed in a leather covering similar to that shown and described in connection with the preferred form of the invention.

In Figs. 9 and 10 I have shown a third modification of the sole pad previously described, wherein the conductors may be similar to those shown in Fig. 5. The conducting plates 58 may be separated by insulation of cork 71, which is sufficiently resilient to transmit pressure forces to the granulated carbon mass 72. It will be understood that the conducting plates of this modification are hermetically sealed in a latex envelope and that a leather covering encloses the whole.

As shown in Fig. 11, preferably three sole pads are used, although a lesser or greater number of sole pads may be used depending upon the information desired. I have found that sole pads placed directly beneath first, the heel, second, the fifth metatarsal head, and third, the first metatarsal head, or, in other words, the essential parts of the osseous tripod, are sufficient to give the desired information.

Figure 16:
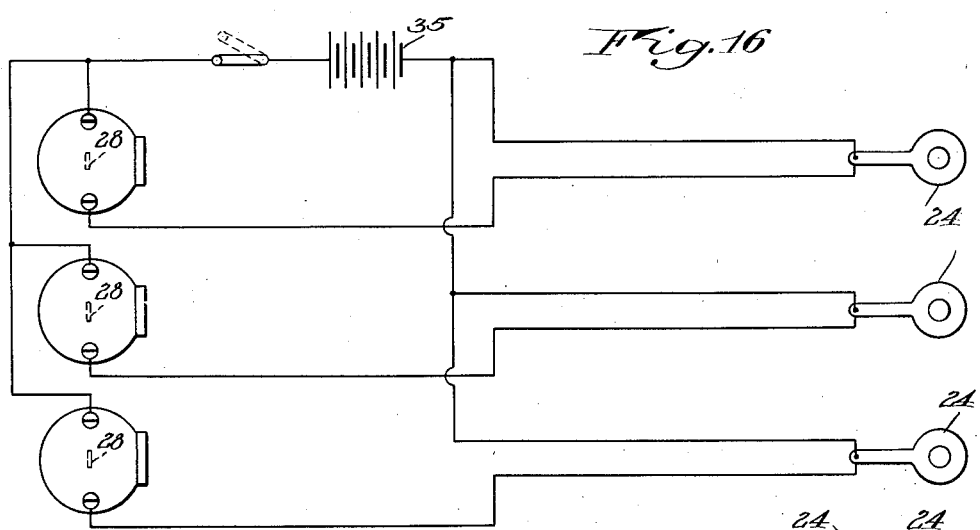
Fig. 16 is a wiring diagram showing the sole pad contacts in series with separate oscillograph elements so as to obtain a separate graph for each part of the foot as shown in Fig. 12.
Figure 17:
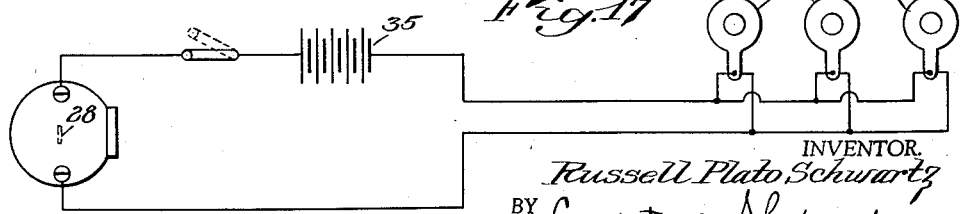
Fig. 17 is a wiring diagram showing the sole pad contacts in parallel with a single oscillograph element to obtain a composite graph as shown in Fig. 13.

When the sole pads are in position and the conducting plates thereof hooked up in parallel with a single oscillograph element, as shown in Fig. 17, a graph is obtained, shown in Fig. 13, which may be called a composite graph. That is the line 73 represents the sum of the pressures exerted on the sole pads. This composite graph is sufficient when interpreted by a competent analyst to give most of the information required. However, I prefer to hook the conducting plates of the sole pads up in series with three oscillograph elements, as shown in Fig. 16, in order to obtain separate pressure curves for each of the parts of the osseous tripod. It will be understood that when the conducting plates are arranged as shown in Fig. 16 that the parts of the oscillograph shown in Figs. 14 and 15 are triplicated and that light beams from three mirrors are being simultaneously cast upon the film. The curves of Fig. 12 have been suitably designated in the drawing to indicate the pressure curves, respectively, of the heel, fifth metatarsal head, and first metatarsal head. The horizontal portions of these curves indicate an absence of pressure.

It will be apparent from Fig. 12 that the sequence, magnitude, and time interval of weight bearing of each part of the osseous tripod may be readily obtained from the curves of Fig. 12, and that these curves will record deformities of gait. Corrective methods may then be applied and by making a series of graphs at intervals, records of improvement or lack of improvement may be obtained. It will further be understood that the apparatus shown may be duplicated for the other foot so that a gait record of both feet may be obtained simultaneously.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. Apparatus for obtaining a visual record of the functioning of the osseous tripod of an animate body in walking, comprising a plurality of pressure responsive, variable resistance devices each applied to a different portion of the sole of the foot of said body, circuit means including each of said devices, and an electrical recording mechanism included in said circuit means and operative to make a composite record of the variations in time and magnitude of the pressures applied to said devices by said foot in walking.

2. Apparatus for obtaining a visual record of the functioning of the osseous tripod of an animate body in walking, comprising a plurality of pressure responsive, variable resistance devices each applied to a different portion of the sole of the foot of said body, a separate circuit including each of said devices, and an electrical recording mechanism connected in said circuits and operative to make separate, juxtaposed records of the variations in time and magnitude of pressure applied to each of said devices by said foot in walking.

3. In apparatus for recording the gait of animate bodies, recording mechanism operative to record variations in time and magnitude of pressure comprising chart means, means for moving said chart means at constant speed, and electrical indicating means for effecting recordings on said chart means in proportion to current flowing therethrough, a source of power, and a plurality of electrically conductive pressure responsive devices operatively carried adjacent the sole of the foot of the body adjacent the cardinal pressure points thereof, said devices being connected with said indicating means and source of power and being varied in electrical conductivity in proportion to the magnitude of pressure thereon at said points of the foot in walking, to veriably actuate said indicating means and effect said recordings.

4. In apparatus for recording the gait of animate bodies, recording mechanism operative to record variations in time and magnitude of pressure comprising a chart, means for moving said chart at constant speed, and an electrical indicator for effecting a record on said chart in proportion to the current flowing therethrough, a source of power, and means for actuating said mechanism comprising a pad and a pair of contacts carried by said pad, said contacts being connected with said indicator and source of power and separated by a material whose conductivity varies with variations in the pressure applied thereto through said contacts, for variably actuating said indicator and effecting said recording.

5. In apparatus for recording the gait of animate bodies, recording mechanism operative to record variations in time and magnitude of pressure comprising chart means, means for moving said chart means at constant speed, and electrical indicating means for effecting recordings on said chart means in proportion to current flowing therethrough, a source of power, and a series of pairs of contacts connected with said indicating means and source of power, each pair having means interposed therebetween for varying the resistance to current flow between said contacts in accordance with variations in pressure applied thereto through said contacts, each of said pairs being located under a different portion of the foot of the body for effecting said recordings of the variations in time and magnitude of pressure thereon in walking.

6. In apparatus for recording the gait of animate bodies, recording mechanism operative to record variations in time and magnitude of pressure comprising a chart, means for moving said chart at constant speed, and an electrical indicator for effecting recordings on said chart in proportion to the current flowing therethrough, a source of power, and a plurality of electrically conductive, pressure responsive devices located under the sole of the foot of the body at the cardinal pressure points thereof, said devices being varied in electrical conductivity in proportion to the magnitude of pressure applied thereto and connected in parallel to said indicator and said source of power for actuating said indicator to produce composite recordings of said variations in time and magnitude of pressure at each of said cardinal points.

7. In apparatus for recording the gait of animate bodies, recording mechanism operative to make separate records of variations in the time and magnitude of a plurality of pressures, respectively, comprising chart means, means for moving said chart means at constant speed, and electrical indicating means for effecting recordings on said chart means in proportion to the current flowing therethrough, a source of power, and a plurality of electrically conductive, pressure responsive devices each located at a different point under the sole of the foot of the body, said devices being varied in electrical conductivity in proportion to the magnitude of pressure applied thereto and being connected with said indicating means, respectively, and with said source of power for effecting said recordings in time and magnitude of pressure at the corresponding points of the foot.

RUSSELL PLATO SCHWARTZ.